(12) United States Patent
Moriyoshi

(10) Patent No.: US 10,536,699 B2
(45) Date of Patent: Jan. 14, 2020

(54) MOVING IMAGE CODING DEVICE, MOVING IMAGE CODING METHOD AND RECORDING MEDIUM FOR STORING MOVING IMAGE CODING PROGRAM

(71) Applicant: NEC Corporation, Tokyo (JP)

(72) Inventor: Tatsuji Moriyoshi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 67 days.

(21) Appl. No.: 15/579,056

(22) PCT Filed: Jun. 2, 2016

(86) PCT No.: PCT/JP2016/002676
§ 371 (c)(1),
(2) Date: Dec. 1, 2017

(87) PCT Pub. No.: WO2016/194380
PCT Pub. Date: Dec. 8, 2016

(65) Prior Publication Data
US 2018/0176567 A1 Jun. 21, 2018

(30) Foreign Application Priority Data
Jun. 3, 2015 (JP) ................. 2015-112787

(51) Int. Cl.
*H04N 19/146* (2014.01)
*H04N 19/124* (2014.01)
(Continued)

(52) U.S. Cl.
CPC ......... *H04N 19/126* (2014.11); *H04N 19/146* (2014.11); *H04N 19/176* (2014.11); *H04N 19/436* (2014.11)

(58) Field of Classification Search
CPC ................. H04N 19/124; H04N 19/146
(Continued)

(56) References Cited

U.S. PATENT DOCUMENTS 5,870,145 A 2/1999 Yada et al.
2005/0232362 A1* 10/2005 Lee .................. H04N 19/13
375/240.23

(Continued)

FOREIGN PATENT DOCUMENTS

JP 2502898 B2 5/1996
JP 2871139 B2 3/1999
(Continued)

OTHER PUBLICATIONS

ITU-T Recommendation H.264, "Advanced video coding for generic audiovisual services", Mar. 2010, pp. 1-676.
(Continued)

*Primary Examiner* — Jeffery A Williams
(74) *Attorney, Agent, or Firm* — Sughrue Mion, PLLC

(57) ABSTRACT

Provided is a moving image coding device capable of executing coding processing including stable rate control processing at high speed without greatly increasing computation amount. A moving image coding device 10 is provided with: a quantization unit 11 that quantizes image data constituting an image to be coded using a plurality of quantization parameters on a quantization-parameter-by-quantization-parameter basis; a storage unit 12 that stores a plurality of pieces of quantized image data in association with the quantization parameters used at the time of quantization; an extraction unit 13 that extracts, from the storage unit 12, predetermined quantized image data using a predetermined quantization parameter; a coding unit 14 that codes the extracted predetermined quantized image data; and a determination unit 15 that on the basis of the result of coding
(Continued)

by the coding unit 14, determines a predetermined quantization parameter used when the extraction unit 13 next extracts predetermined quantized image data.

10 Claims, 11 Drawing Sheets

(51) Int. Cl.
*H04N 19/126* (2014.01)
*H04N 19/436* (2014.01)
*H04N 19/176* (2014.01)

(58) Field of Classification Search
USPC .................................................. 375/240.03
See application file for complete search history.

(56) References Cited

U.S. PATENT DOCUMENTS

| 2006/0034522 | A1* | 2/2006 | Mohsenian | H04N 19/15 |
| | | | | 382/232 |
| 2011/0200102 | A1 | 8/2011 | Saitoh et al. | |
| 2011/0200266 | A1* | 8/2011 | Fuchie | H04N 19/176 |
| | | | | 382/251 |
| 2014/0341276 | A1 | 11/2014 | Lee | |

FOREIGN PATENT DOCUMENTS

| JP | 2005-348310 A | 12/2005 |
| JP | 2006-121538 A | 5/2006 |
| JP | 2011-171855 A | 9/2011 |
| WO | 96/028937 A1 | 9/1996 |
| WO | 2010/041488 A1 | 4/2010 |
| WO | 2013/115572 A1 | 8/2013 |
| WO | 2014/167609 A1 | 10/2014 |

OTHER PUBLICATIONS

ITU-T Recommendation H.265, "Series H: Audiovisual and Multimedia Systems Infrastructure of audiovisual services—Coding of moving video", Apr. 2013, pp. 1-317.

Keng-Pang Lim, "Text Description of Joint Model Reference Encoding Methods and Decoding Concealment Methods", Joint Video Team (JVT) of ISO/IEC MPEG and ITU-T VCED, Document JVT-O079, Apr. 2005, pp. 1-44.

K. McCann, et al., "High Efficiency Video Coding (HVEC) Test Model 16 (HM 16) Improved Encoder Description", Joint Collaborative Team on Video Coding (JCT-VC) of ITU-T SG16 WP3 and ISO/IEC JTC1/SC29/WG11, Document JCTVC-S1002, Oct. 2014, pp. 1-54.

International Search Report for PCT/JP2016/002676 dated Aug. 16, 2016 [PCT/ISA/210].

Written Opinion for PCT/JP2016/002676 dated Aug. 16, 2016 [PCT/ISA/237].

* cited by examiner

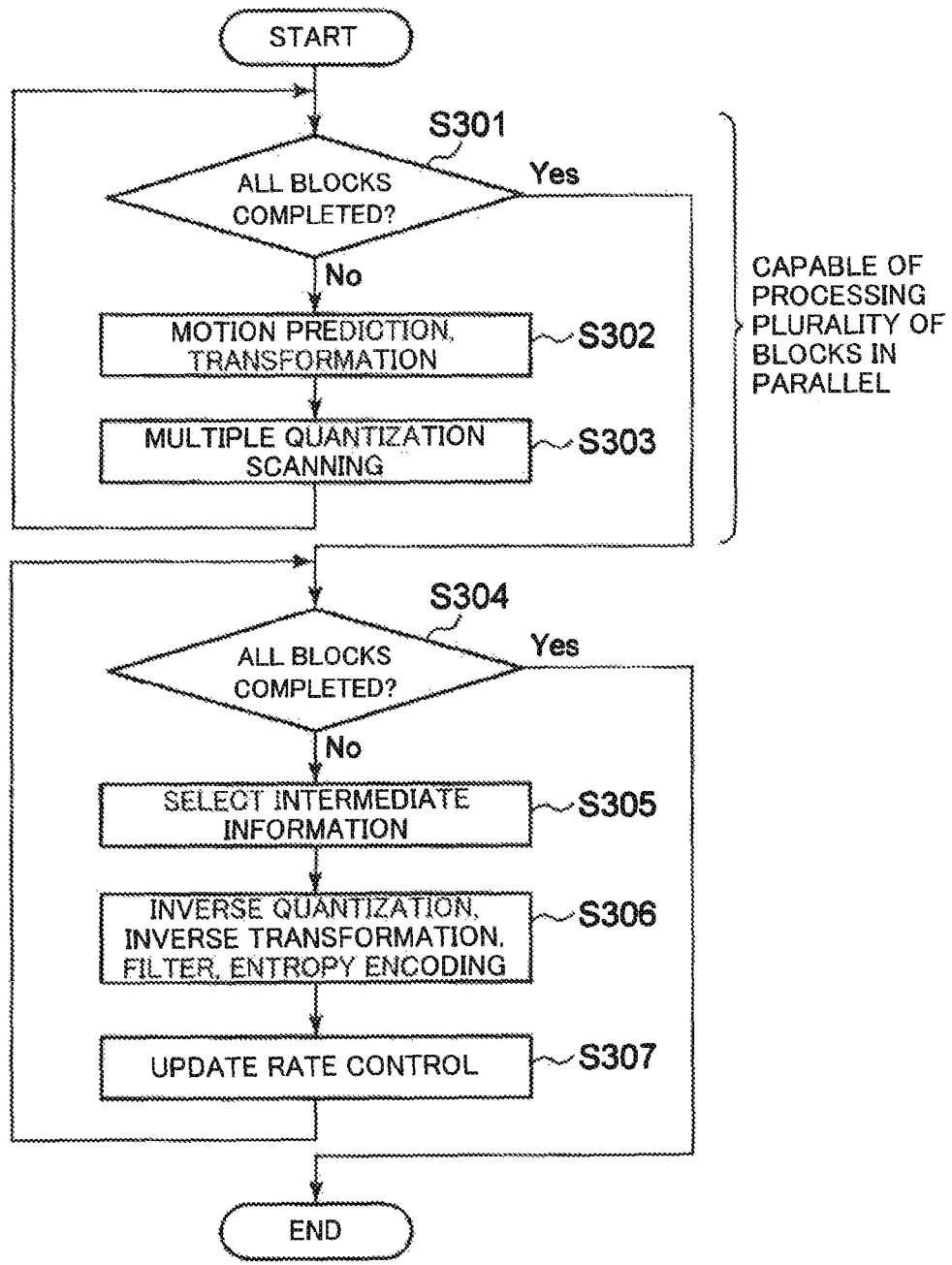

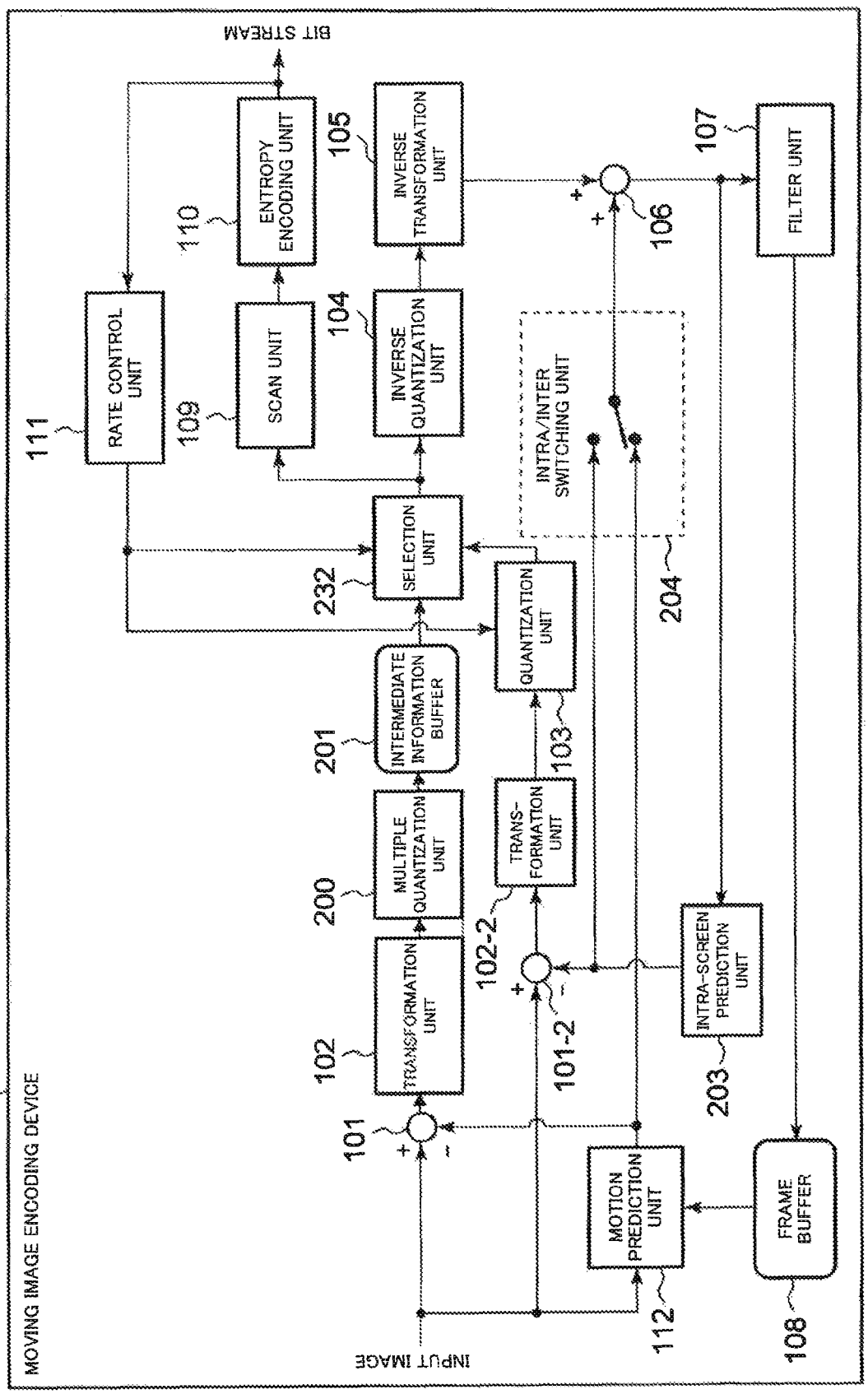

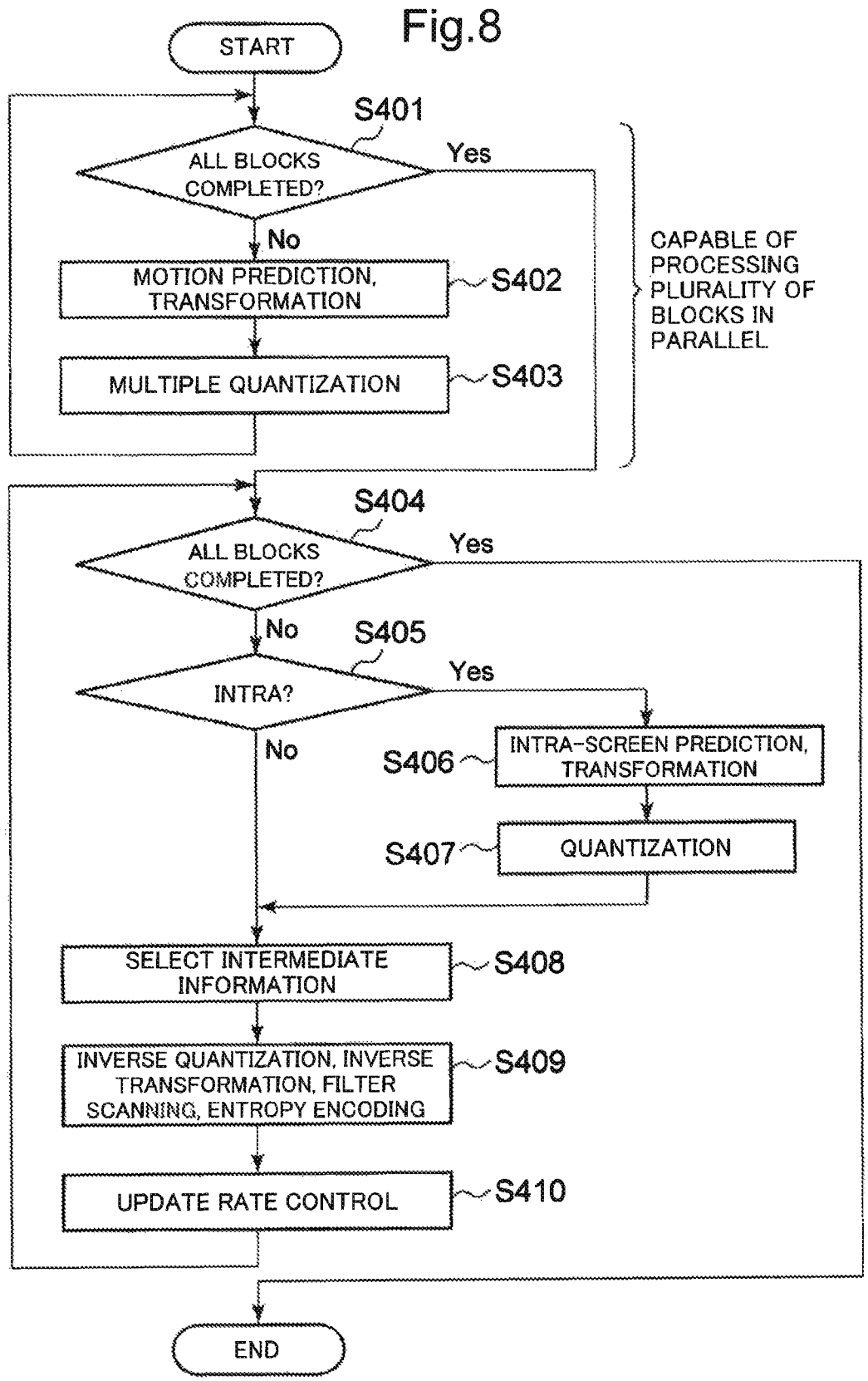

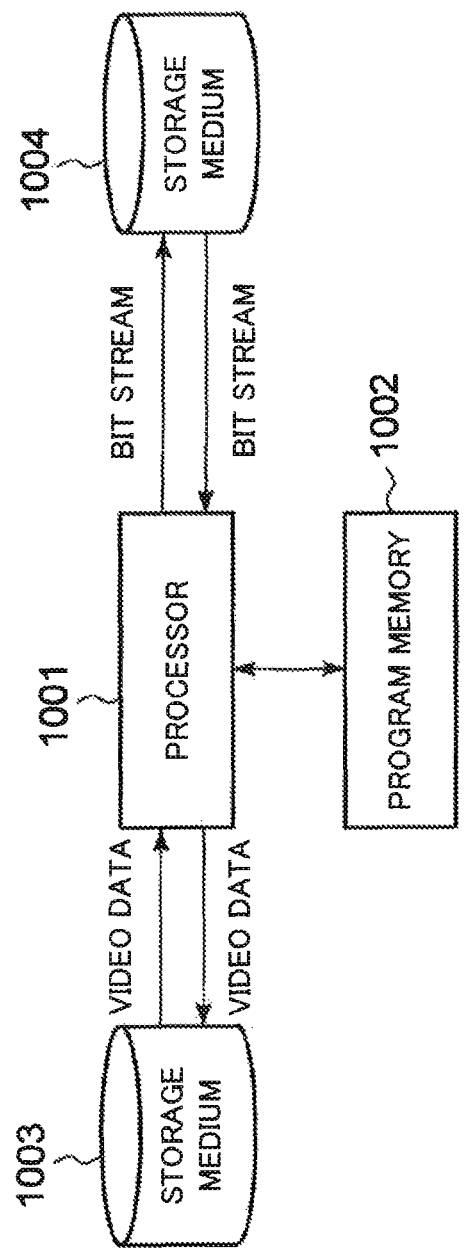

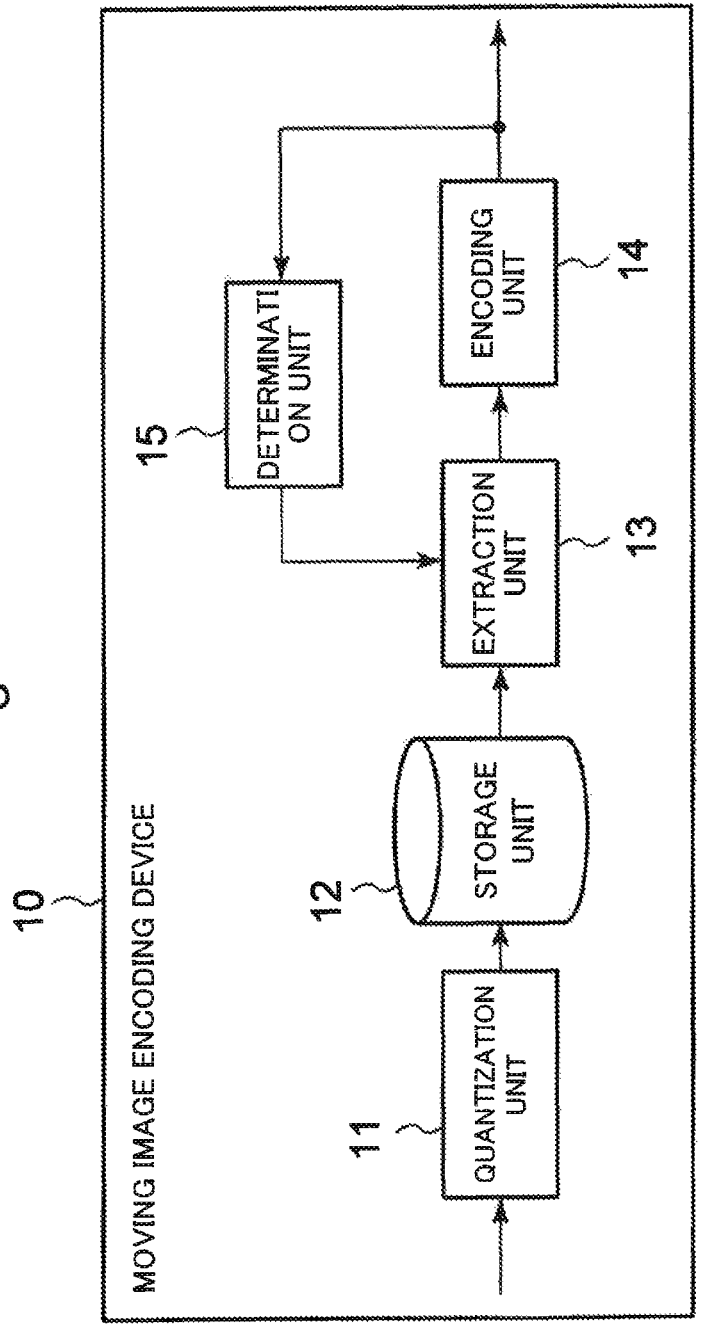

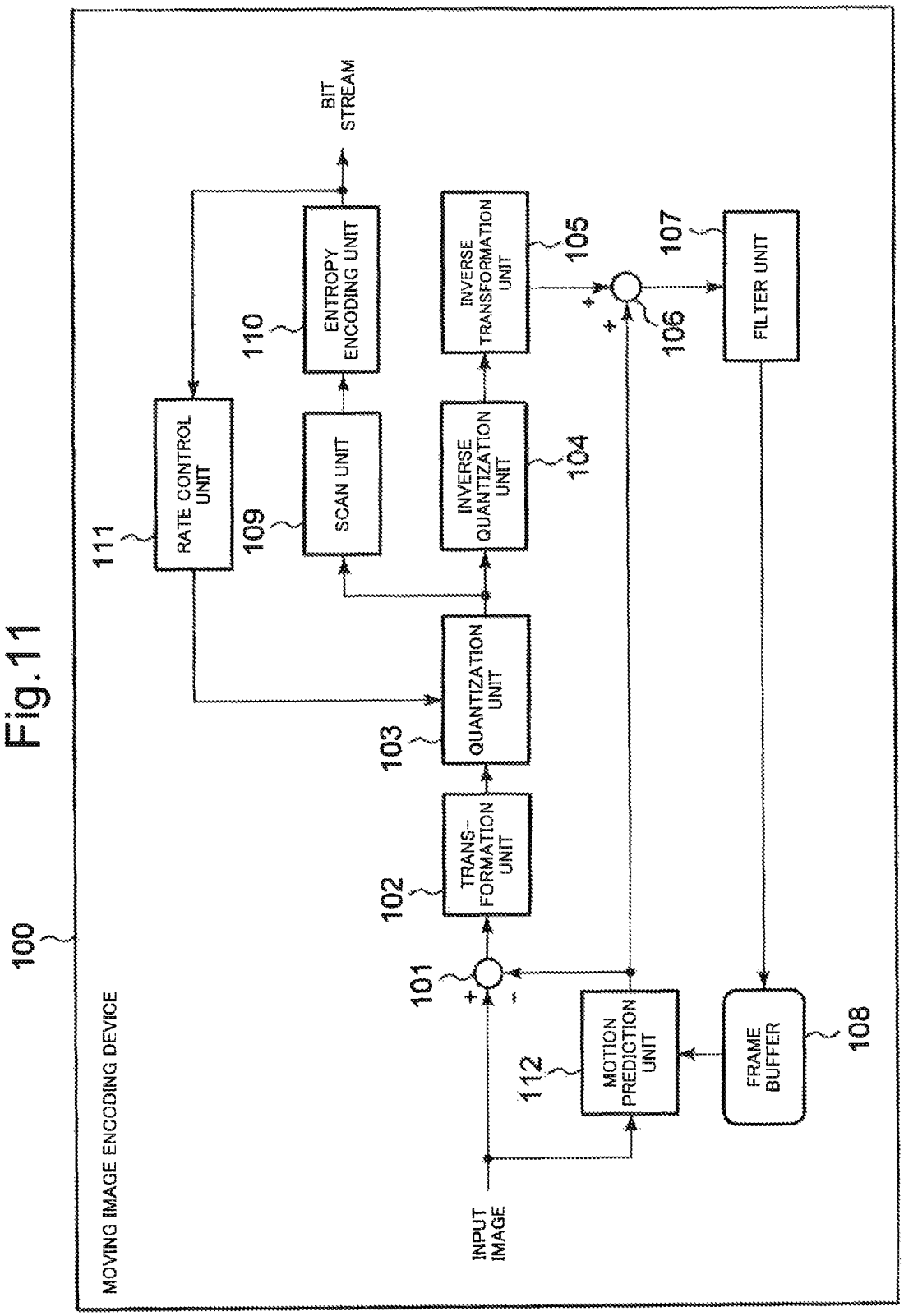

MOVING IMAGE CODING DEVICE, MOVING IMAGE CODING METHOD AND RECORDING MEDIUM FOR STORING MOVING IMAGE CODING PROGRAM

CROSS REFERENCE TO RELATED APPLICATIONS

This application is a National Stage of International Application No. PCT/JP2016/002676 filed Jun. 2, 2016, claiming priority based on Japanese Patent Application No. 2015-112787 filed Jun. 3, 2015, the contents of all of which are incorporated herein by reference in their entirety.

TECHNICAL FIELD

The present invention relates to a moving image coding device, a moving image coding method, and a storage medium for recording a moving image coding program that enable to execute coding processing at a high speed.

BACKGROUND ART

A moving image compression encoding technique is widely spread. A moving image compression encoding technique is widely used for various purposes such as digital broadcasting, video content distribution by an optical disc, and video distribution via the Internet or the like.

As a technique of generating encoded data by encoding a moving image signal at a low bit rate, at a high compression rate, and with a high image quality, and decoding an encoded moving image, for example, there are H.261 and H.263 standardized by the International Telecommunication Union (ITU). There are also Moving Picture Export Group (MPEG)-1, MPEG-2, and MPEG-4 by the International Organization for Standardization (ISO), and VC-1 by the Society of Motion Picture and Television Engineers (SMPTE). H.261, H.263, MPEG-1, MPEG-2, MPEG-4, and VC-1 are widely used as a technique in accordance with the international standards.

H.264/MPEG-4 Advanced Video Coding (AVC) (hereinafter, referred to as H.264), which is described in NPL1 and standardized by the ITU and the ISO in cooperation with each other, is also spread. H.265/MPEG-H High Efficiency Video Coding (HEVC) (hereinafter, referred to as H.265) described in NPL 2 is standardized as a latest moving image compression encoding standard in the year 2013. H.265 is able to compress a data size to about a half, as compared with H.264, while keeping substantially the same video quality as H.264. H.265 has a possibility of being widely used in all fields.

The aforementioned moving image encoding technique is configured by combining a plurality of element techniques such as motion compensation prediction, orthogonal transformation of a prediction error image, quantization of an orthogonal transformation coefficient, and entropy encoding of a quantized orthogonal transformation coefficient. Encoding in a moving image encoding technique is referred to as hybrid encoding.

The aforementioned moving image encoding technique increases a compression rate of a moving image by performing inter-frame prediction using a level of image correlation in a time axis direction, which is one of characteristics of a moving image. In inter-frame prediction, generally, a motion compensation prediction technique of generating a prediction image by correcting a motion and a positional deviation of a subject, a background, and the like between images which are temporally close to each other.

FIG. 11 illustrates one example of a configuration of a moving image encoding device in which inter-frame prediction is used as a prediction method. FIG. 11 is a block diagram illustrating a configuration example of a general moving image encoding device.

A moving image encoding device 100 illustrated in FIG. 11 includes a subtraction unit 101, a transformation unit 102, a quantization unit 103, an inverse quantization unit 104, an inverse transformation unit 105, an adder unit 106, a filter unit 107, a frame buffer 108, a scan unit 109, an entropy encoding unit 110, a rate control unit 111, and a motion prediction unit 112.

When a new image is input to the moving image encoding device 100, the moving image encoding device 100 executes encoding processing separately on each image block of a predetermined size.

For example, when H.264 is used as a moving image compression encoding method, the moving image encoding device 100 executes encoding processing separately on each block of 16×16 pixels, which is referred to as a macroblock (MB). When H.265 is used as a moving image compression encoding method, the moving image encoding device 100 executes encoding processing on each block of 16×16 pixels, 32×32 pixels, 64×64 pixels, or the like, which is referred to as a coding tree unit (CTU).

When a new image is input, the motion prediction unit 112 detects a position change of an image block of an input image, which corresponds to an image block of an encoded image stored in the frame buffer 108. The frame buffer 108 stores image data of an already encoded frame.

The motion prediction unit 112 finds out motion vector information corresponding to the detected position change. The motion prediction unit 112 executes motion compensation prediction processing on the basis of the motion vector information that is found out, and outputs a motion compensation prediction image.

The motion compensation prediction image is input from the motion prediction unit 112 into the subtraction unit 101. Next, the subtraction unit 101 subtracts the motion compensation prediction image from the input image. The subtraction unit 101 sets, as a prediction error image, an image obtained by subtracting the motion compensation prediction image, and outputs the prediction error image.

The prediction error image is input from the subtraction unit 101 into the transformation unit 102. The transformation unit 102 executes orthogonal transformation processing equivalent to Discrete Cosine Transform (DCT) on the input prediction error image. The transformation unit 102 generates a transformation coefficient sequence by executing orthogonal transformation processing, and outputs the generated transformation coefficient sequence.

For example, when H.264 is used as a moving image compression encoding method, orthogonal transformation processing is executed independently on each block of 4×4 pixels or 8×8 pixels. When H.265 is used as a moving image compression encoding method, orthogonal transformation processing is executed independently on each block of 4×4 pixels, 8×8 pixels, 16×16 pixels, or 32×32 pixels.

The transformation unit 102 may transform a prediction error image by executing orthogonal transformation processing equivalent to DCT or another transformation processing such as a Wavelet transformation. The moving image encoding device 100 may not necessarily include a transformation unit that executes transformation processing on a prediction error image.

The transformation coefficient sequence is input from the transformation unit 102 into the quantization unit 103, and a quantization parameter (QP) is input from the rate control unit 111 into the quantization unit 103. The quantization unit 103 executes quantization processing on the input transformation coefficient sequence on the basis of the input quantization parameter, and generates a quantized transformation coefficient sequence. The quantization unit 103 outputs the generated quantized transformation coefficient sequence.

The quantized transformation coefficient sequence is input from the quantization unit 103 into the inverse quantization unit 104. The inverse quantization unit 104 executes inverse quantization processing on the input quantized transformation coefficient sequence, and generates a transformation coefficient sequence. The inverse quantization unit 104 outputs the generated transformation coefficient sequence.

The transformation coefficient sequence is input from the inverse quantization unit 104 into the inverse transformation unit 105. The inverse transformation unit 105 executes inverse integer transformation processing on the input transformation coefficient sequence, and generates a prediction error image. The inverse transformation unit 105 outputs the generated prediction error image.

The prediction error image is input from the inverse transformation unit 105 into the adder unit 106, and a prediction image is input from the motion prediction unit 112 into the adder unit 106. The adder unit 106 adds the input prediction error image and the input prediction image, and outputs an image generated by adding.

The image obtained by adding the prediction error image and the prediction image is input from the adder unit 106 into the filter unit 107. The filter unit 107 generates a local decoded image by executing filter processing on the input image.

Filter processing executed by the filter unit 107 is processing of reducing distortion arising in an image because of encoding. For example, when H.264 and H.265 are used as a moving image compression encoding method, a deblocking filter is used in filter processing. When H.265 is used as a moving image compression encoding method, Sample Adaptive Offset is also used in filter processing.

The local decoded image generated by the filter unit 107 is stored in the frame buffer 108. A local decoded image is used in encoding a succeeding frame.

The quantized transformation coefficient sequence is input from the quantization unit 103 into the scan unit 109. The scan unit 109 executes predetermined scan processing on the input quantized transformation coefficient sequence, and rearranges the quantized transformation coefficient sequence. The predetermined scan processing is, for example, zigzag scanning. The scan unit 109 outputs a rearranged transformation coefficient sequence.

The rearranged transformation coefficient sequence is input from the scan unit 109 into the entropy encoding unit 110. The entropy encoding unit 110 executes entropy encoding processing on the input rearranged transformation coefficient sequence in accordance with a predetermined rule, and generates a bit stream. The entropy encoding unit 110 outputs the generated bit stream.

For example, when H.264 and H.265 are used as a moving image compression encoding method, Context Adaptive Binary Arithmetic Coding (CABAC) is used in entropy encoding processing. When H.264 is used as a moving image compression encoding method, Context-based Adaptive VideoLAN Client (CAVLC) may be used in entropy encoding processing.

The bit stream is input from the entropy encoding unit 110 into the rate control unit 111. The rate control unit 111 calculates a quantization parameter used in quantization of a succeeding block on the basis of statistical information of the input bit stream.

The statistical information, used by the rate control unit 111, of the bit stream is, for example, a code amount per block, or a code amount per context. A specific processing content of the quantization parameter calculation processing is described in, for example. NPL 3 or NPL 4.

For example, it is often the case that a bit rate of a bit stream to be output is designated, and the moving image encoding device 100 is required to controll a rate in such a manner that the rate coincides with the designated bit rate. The rate control unit 111 executes rate control processing of controlling a rate in such a manner that the rate coincides with the designated bit rate.

For example, a specific content of rate control processing in H.265 is described in NPL 4. In the rate control processing described in NPL 4, on the basis of a degree of importance or the like of each of the image frames, a target bit number (TCurrPic) of each of the frames is calculated. In frame encoding processing, feedback control is executed in such a manner that a bit number of a frame coincides with TCurrPic.

Specifically, when a predetermined CTU is encoded, the number of bits generated in an already encoded CTU group is subtracted from TCurrPic. The remaining bit number of TCurrPic after subtraction is distributed in an uncoded CTU group. A quantization parameter to be used in quantization processing of a CTU is calculated on the basis of bit numbers each assigned to CTUs.

As described above, in a moving image encoding device, a series of image processing and signal processing, i.e., motion prediction processing, transformation processing, quantization processing, inverse quantization processing, inverse transformation processing, and filter processing, are executed for multiple images. In other words, generally, an enormous amount of computation is required for execution of moving image encoding processing.

Therefore, when moving image encoding processing is executed by causing a general-purpose processor to control software, a processor operative at a high operating frequency is required. Using a processor operative at a high operating frequency causes a problem of increase in cost and electric power consumption.

It is often the case that a processor operative at a high operating frequency does not have computing power capable of processing an input moving image at the time of input thereof. Therefore, when a processor operative at a high operating frequency processes a moving image having high resolution at the time of input thereof, there occurs a problem that processing time gets longer.

Even when encoding processing is executed by dedicated hardware, a processing circuit operative at a high speed is required, and consequently, there occurs a problem of increase in cost and electric power consumption. Using a processing circuit operative at a high speed is highly likely to cause hardware designing to become complicated, and a development period to be extended.

In order to solve the aforementioned problems, a technique has been developed in which image processing and signal processing are executed at a high efficiency and at a high speed by using, in addition to a general-purpose processor, another processor, a processing circuit, or the like having a configuration appropriate for moving image encoding processing as an accelerator.

As an accelerator, for example, a Graphics Processing Unit (GPU) is used. A Digital Signal Processor (DSP) or a Field Programmable Gate Array (FPGA) may also be used as an accelerator.

A GPU is a processor used normally in three-dimensional graphics processing. However, a GPU has a configuration of a large-scale parallel processor, in which several hundreds to several thousands of processor cores are integrated. Therefore, as far as processing is appropriate for characteristics of a GPU, the GPU is able to execute the processing at a speed several times to several ten times as fast as a general-purpose processor.

Generally, a computation amount relating to motion vector search processing, which is executed by the motion prediction unit 112 of the moving image encoding device 100 illustrated in FIG. 11, is large. Therefore, when the motion prediction unit 112 is implemented by a GPU or the like, motion vector search processing is executed at a high speed, as compared with when the motion prediction unit 112 is implemented by a CPU.

A computation amount relating to processing such as transformation processing, quantization processing, and scan processing is also large. When more sophisticated and complicated quantization processing including adaptive QP selection processing, RD optimal quantization processing, or the like described in NPL 4 is executed as quantization processing, for example, a computation amount relating to quantization processing further increases.

PTL 1 describes an efficient technique of executing, in parallel by using a GPU, transformation processing, quantization processing, and scan processing that require large computation amounts for execution.

An information processing device described in PTL 1 executes transformation processing, quantization processing, and scan processing in parallel by a GPU. Next, the GPU inputs intermediate data that is a processing result of parallel processing into a CPU that is a general-purpose processor. The CPU executes lossless compression processing on the intermediate data. The lossless compression processing corresponds to entropy encoding processing executed by the entropy encoding unit 110 illustrated in FIG. 11.

As described above, the information processing device described in PTL 1 assigns processing to be executed to a GPU and a CPU in a distributive manner. Specifically, transformation processing, quantization processing, and scan processing, which are predetermined computation capable of being executed for each block in parallel, are assigned to a GPU which has high capability for parallel computation. Lossless compression processing, in which a data size after compression fluctuates, and which is not easy to be executed in parallel, is assigned to a CPU which has high capability for complicated bit analysis or the like. When processing is assigned suitable for each characteristic of a GPU and a CPU, efficiency of executing processing of a whole device is enhanced.

CITATION LIST

Patent Literature

[PTL 1] PCT International Publication No. WO2014/167609
[PTL 2] Specification of Japanese Patent No. 2871139
[PTL 3] Specification of Japanese Patent No. 2502898
[PTL 4] Japanese Unexamined Patent Application Publication No. 2006-121538
[PTL 5] PCT International Publication No. 2010/041488

Non Patent Literature

[NPL 1] ITU-T Recommendation H.264, "Advanced video coding for generic audiovisual services", March, 2010
[NPL 2] ITU-T Recommendation H.265, "Advanced video coding for generic audiovisual services", April, 2013
[NPL 3] Joint Video Team (JVT) of ISO/IEC MPEG and ITU-T VCEG, Document JVT-O079, "Text Description of Joint Mode Reference Encoding Method and Decoding Concealment Method", April, 2005
[NPL 4] Joint Collaborative Team on Video Coding (JCT-VC) of ITU-T SG16 WP3 and ISO/IEC JTC1/SC29/WG11, Document JCTVC-S1002, "High Efficiency Video Coding (HEVC) Test Model 16 (HM 16) Improved Encoder Description", October, 2014

SUMMARY OF INVENTION

Technical Problem

A problem of the information processing device described in PTL 1 is that rate control processing within a frame is not achieved. A GPU in the information processing device executes quantization processing on a plurality of blocks in parallel, and inputs an execution result into a CPU. The CPU executes entropy encoding processing on the plurality of blocks that are quantized.

However, in rate control processing within a frame, as described above, feedback control is required in such a manner that a quantization parameter is adjusted on the basis of the number of bits generated in an encoded block within a frame, and the adjusted quantization parameter is used in next quantization processing.

In the information processing device described in PTL 1, or the like, quantization processing by a GPU is executed in parallel before entropy encoding processing by a CPU is executed. That is, encoding processing is started after all of quantization processing are completed. Therefore, the information processing device described in PTL 1 is unable to feed back a rate controlled as described above to quantization processing.

When a controlled rate is not fed back to quantization processing, the number of bits generated in a frame is not converged to a target bit number, and becomes unstable. Instability in the number of bits generated in a frame may cause a behavior, such as image quality deterioration due to fluctuation of an image quality between frames, or the like, and an excess of the number of bits generated in a frame over an upper limit bit number per frame, which is not intended by a user.

PTL 2 and PTL 3 describe other encoding devices. The encoding device described in PTL 2 executes two-pass processing in order to achieve both parallel execution of quantization processing and rate control within a frame.

Specifically, the encoding device described in PTL 2 executes encoding processing of a frame two times. In first-time encoding processing (i.e. the first pass), the encoding device executes encoding processing of a frame with use of a temporary quantization parameter, and records information on the number of bits generated in a encoded block within a frame.

In second-time encoding processing (i.e. the second pass), the encoding device estimates an appropriate quantization parameter from a relation between the temporary quantization parameter used by the first pass, and the number of generated bits obtained in the first pass.

The encoding device executes encoding processing of a frame again with use of the estimated quantization parameter. The encoding device is also able to execute processing of forcibly discarding high frequency coefficients for each target area in which encoding is executed in parallel, in order to prevent an excess of the number of generated bits over an upper limit bit number.

A problem of the encoding device described in PTL 2 is that a computation amount relating to processing increases by two times, since encoding is executed two times. When high frequency coefficients are discarded for each target area in which encoding is executed in parallel, even when an excess of a bit number does not occur in a whole frame, coefficients may be discarded in a specific area. When coefficients are discarded in the specific area, image quality deterioration, which is essentially not necessary, may occur.

The encoding device described in PTL 3 predicts the number of bits generated in a frame being encoded on the basis of history information on a relation between a quantization parameter and the number of generated bits in an encoded frame, and of information on analysis of complexity distribution of an image or the like. The encoding device controls a quantization parameter on the basis of the predicted number of generated bits.

A problem of the encoding device described in PTL 3 is that the number of generated bits for use in control is a predicted value, and rate control becomes unstable when a prediction error on the number of generated bits increases. For example, when the character of an image of a frame being processed greatly changes from the character of an image of a frame processed in the past, a prediction error on the number of generated bits may increase.

As described above, the encoding devices described in PTL 2 and PTL 3 are able to achieve both parallel execution of quantization processing and rate control within a frame. However, when the encoding devices described in PTL 2 and PTL 3 are used, there occur a problem that a computation amount relating to processing increases, and a problem that rate control is unstable.

For this reason, an object of the present invention is to provide a moving image encoding device, a moving image encoding method, and a storage medium storing a moving image encoding program that enable to execute encoding processing including stable rate control processing at a high speed without greatly increasing a computation amount.

Solution to Problem

A moving image encoding device according to the present invention includes: quantization means for quantizing data of an image included in an encoding target image by using a plurality of quantization parameters separately for each of the plurality of quantization parameters; storage means for storing a plurality of pieces of quantized data of the image, each of the plurality of pieces of quantized data being associated with a quantization parameter used when quantizing; extraction means for extracting a piece of predetermined-quantized data of the image from the storage means, the piece of the predetermined-quantized data being quantized by using a predetermined quantization parameter; encoding means for encoding the extracted piece of predetermined-quantized data of the image; and determination means for determining a predetermined quantization parameter to be used when the extraction means extracts a piece of predetermined-quantized data of the image next, based on a result of encoding by the encoding means.

A moving image encoding method according to the present invention includes: quantizing data of an image included in an encoding target image by using a plurality of quantization parameters separately for each of the plurality of quantization parameters; storing a plurality of pieces of quantized data of the image, each of the plurality of pieces of quantized data being associated with a quantization parameter used when quantizing; extracting a piece of predetermined-quantized data of the image quantized by using a predetermined quantization parameter from the stored plurality of pieces of quantized data of the image, the piece of the predetermined-quantized data being quantized by using a predetermined quantization parameter; encoding the extracted piece of the predetermined-quantized data of the image; and determining a predetermined quantization parameter to be used when extracting a piece of the predetermined-quantized data of the image next, based on a result of encoding.

A storage medium according to the present invention stores a moving image encoding program which causes a computer to execute: quantization processing of quantizing data of an image included in an encoding target image by using a plurality of quantization parameters separately for each of the plurality of quantization parameters; storage processing of storing a plurality of pieces of quantized data of the image, each of the plurality of pieces of quantized data being associated with a quantization parameter used when quantizing; extraction processing of extracting a piece of predetermined-quantized data of the image from the stored plurality of pieces of the quantized data of the image, the piece of the predetermined-quantized data being quantized by using a predetermined quantization parameter; encoding processing of encoding the extracted piece of the extracted-quantized data of the image; and determination processing of determining a predetermined quantization parameter to be used when extracting a piece of predetermined-quantized data of the image next, based on a result of encoding by the encoding processing.

Advantageous Effects of Invention

According to the present invention, it is possible to execute encoding processing including stable rate control processing at a high speed without greatly increasing a computation amount.

BRIEF DESCRIPTION OF DRAWINGS

FIG. 6 is a flowchart illustrating an operation of an entirety of encoding processing by a moving image encoding device 100 in the third example embodiment.

FIG. 7 is a block diagram illustrating a configuration example of a fourth example embodiment of the moving image encoding device according to the present invention.

FIG. 8 is a flowchart illustrating an operation of an entirety of encoding processing by a moving image encoding device 100 in the fourth example embodiment.

FIG. 9 is a block diagram illustrating a configuration example of an information processing device capable of achieving functions of the moving image encoding device according to the present invention.

FIG. 10 is a block diagram illustrating an outline of the moving image encoding device according to the present invention.

FIG. 11 is a block diagram illustrating a configuration example of a general moving image encoding device.

DESCRIPTION OF EMBODIMENTS

First Example Embodiment

[Description of Configuration]

Figure 1:
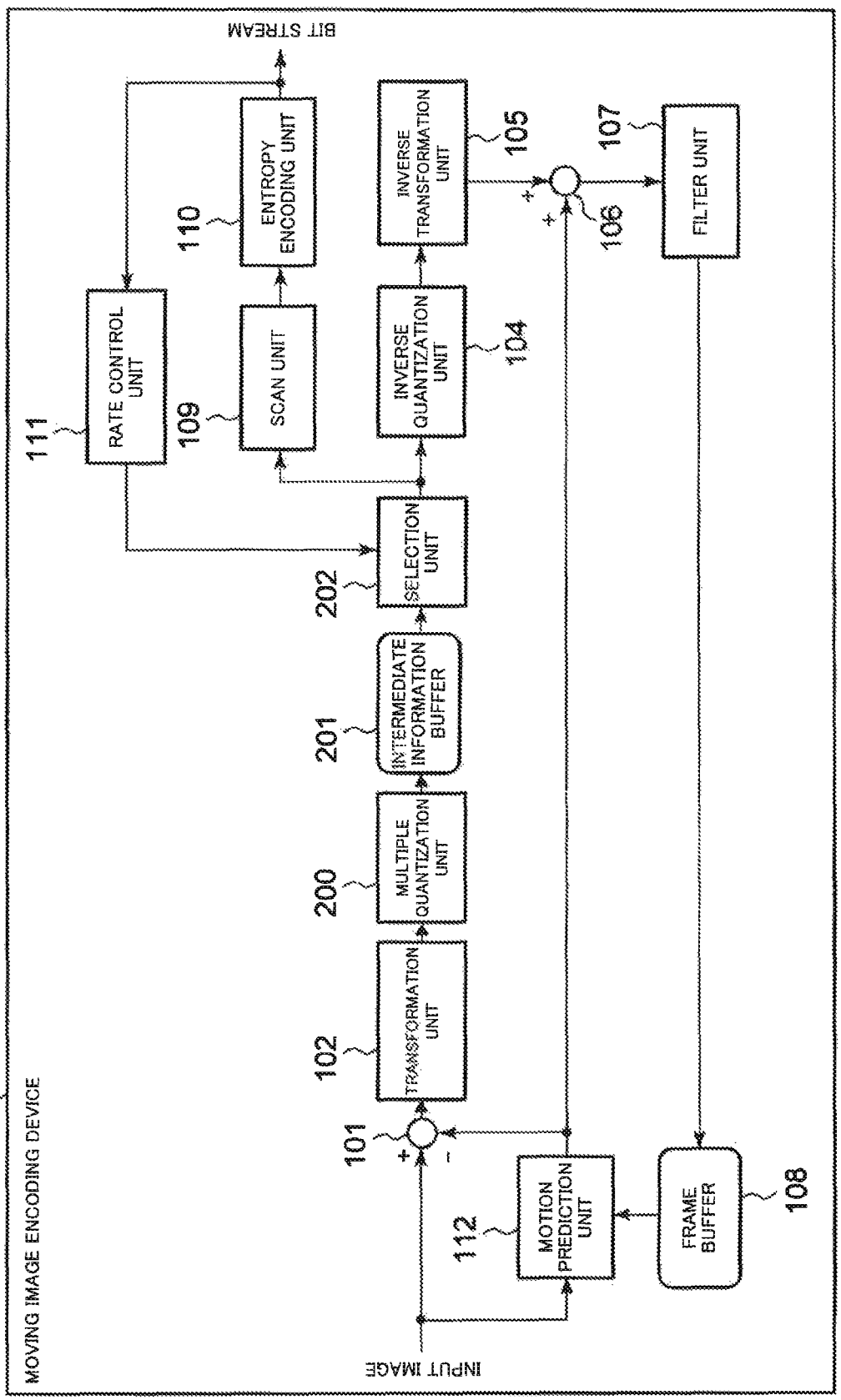
FIG. 1 is a block diagram illustrating a configuration example of a first example embodiment of a moving image encoding device according to the present invention.

In the following, an example embodiment of the present invention is described with reference to the drawings. FIG. 1 is a block diagram illustrating a configuration example of the first example embodiment of a moving image encoding device according to the present invention.

As illustrated in FIG. 1, a moving image encoding device 100 in the present example embodiment is different from the moving image encoding device 100 illustrated in FIG. 11 in a point that a multiple quantization unit 200, an intermediate information buffer 201, and a selection unit 202 are included. A configuration of the moving image encoding device 100 illustrated in FIG. 1 is the same as a configuration of the moving image encoding device 100 illustrated in FIG. 11 except for the multiple quantization unit 200, the intermediate information buffer 201, and the selection unit 202.

The multiple quantization unit 200 has a function of executing quantization processing on a transformation coefficient sequence input from a transformation unit 102 by using a plurality of quantization parameters of two or more types.

The multiple quantization unit 200 quantizes an input transformation coefficient sequence for each of quantization parameters of different types. After the quantization, the multiple quantization unit 200 stores, in the intermediate information buffer 201, a plurality of quantized transformation coefficient sequences each in association with quantization parameters used in quantization processing.

The intermediate information buffer 201 has a function of storing a quantized transformation coefficient sequence in association with a quantization parameter used when the transformation coefficient sequence is quantized.

The selection unit 202 has a function of selecting and outputting a predetermined quantized transformation coefficient sequence from among quantized transformation coefficient sequences stored in the intermediate information buffer 201 by using a quantization parameter input from a rate control unit 111.

The multiple quantization unit 200 is able to execute quantization processing by using all selectable quantization parameters in a standard such as H.264 or H.265. For example, in the standard of H.264 or H.265, fifty-two quantization parameters 0 to 51 are used.

Therefore, the multiple quantization unit 200 is able to execute quantization processing of fifty-two types each associated with the quantization parameters 0 to 51. The multiple quantization unit 200 stores, in the intermediate information buffer 201, a quantized transformation coefficient sequence and a quantization parameter used in quantization processing in association with each other.

In the aforementioned example, a transformation coefficient sequence quantized on the basis of a quantization parameter input from the rate control unit 111 is stored in the intermediate information buffer 201 certainly. The selection unit 202 selects and outputs a quantized transformation coefficient sequence stored in association with a quantization parameter input from the rate control unit 111.

The multiple quantization unit 200 may execute quantization processing without using all selectable quantization parameters, for example, by using every two quantization parameters (such as quantization parameters 0, 2, 4, 8, . . . ). The multiple quantization unit 200 may execute quantization processing by using every three quantization parameters (such as quantization parameters 0, 3, 6, 9, . . . ).

The multiple quantization unit 200 may execute quantization processing by using a plurality of quantization parameters within a predetermined range including a predetermined quantization parameter as a center. For example, the multiple quantization unit 200 may use a plurality of quantization parameters within a range including 30 that is a quantization parameter as a center, a quantization parameter larger than the center by four as an upper limit, and a quantization parameter smaller than the center by four as a lower limit.

For example, when every two quantization parameters are used, the multiple quantization unit 200 executes five of quantization processing by using five quantization parameters (i.e. 26, 28, 30, 32, and 34). A value calculated from information such as a target bit number of a frame may be set as a quantization parameter being a center.

Quantization parameters to be used by the multiple quantization unit 200 are not limited to the aforementioned examples. The multiple quantization unit 200 is able to use quantization parameters of various patterns. The multiple quantization unit 200 is able to use various selection procedures other than the aforementioned quantization parameter selection procedure.

When the multiple quantization unit 200 does not execute quantization processing by using all selectable quantization parameters, there is a possibility that a transformation coefficient sequence quantized on the basis of a quantization parameter input from the rate control unit 111 is not stored in the intermediate information buffer 201.

In the aforementioned case, when a transformation coefficient sequence quantized on the basis of a quantization parameter which is input is stored, the selection unit 202 extracts a transformation coefficient sequence associated with the quantization parameter which is input. When a transformation coefficient sequence quantized based on a quantization parameter which is input is not stored, the selection unit 202 may extract another quantized transformation coefficient sequence. For example, the selection unit 202 may extract a transformation coefficient sequence quantized on the basis of a quantization parameter the value of which is closest to a quantization parameter which is input, from among transformation coefficient sequences stored in the intermediate information buffer 201.

When the selection unit 202 selects a transformation coefficient sequence associated with a quantization parameter, which is different from a quantization parameter input from the rate control unit 111, an error may occur between a bit number assigned by the rate control unit 111 when a quantization parameter is determined, and an output bit number. However, even when the error occurs, feedback control is immediately executed so that an error does not occur when an image block is encoded next time and thereafter. Therefore, stable rate control is achieved within a frame as a whole.

As described above, the rate control unit 111 is able to execute the same feedback control as in the moving image encoding device 100 illustrated in FIG. 11. Specifically, the moving image encoding device in the present example embodiment is also able to achieve stable rate control.

[Description of Operation]

Figure 2:
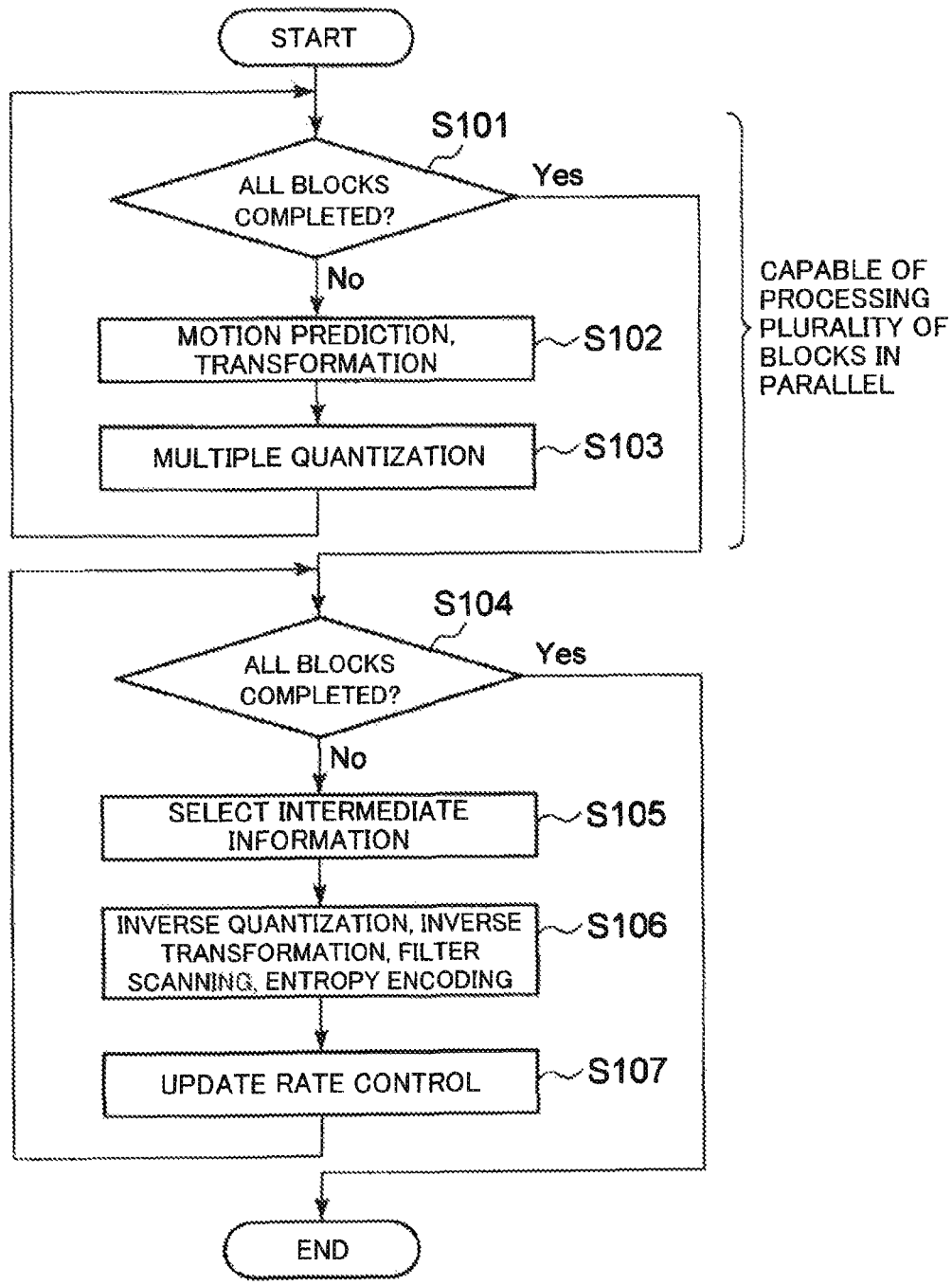
FIG. 2 is a flowchart illustrating an operation of an entirety of encoding processing by a moving image encoding device 100 in the first example embodiment.

In the following, an operation of the moving image encoding device 100 in the present example embodiment is described with reference to FIG. 2. FIG. 2 is a flowchart illustrating an operation of an entirety of encoding processing by the moving image encoding device 100 in the first example embodiment.

When processing is started, the moving image encoding device 100 executes quantization processing on each of image blocks in a frame. The moving image encoding device 100 confirms whether or not quantization processing is completed for all the image blocks in the frame (Step S101).

When there is an image block for which quantization processing is not completed among all the image blocks in the frame (No in Step S101), the motion prediction unit 112 executes motion compensation prediction processing on an image block which is not quantized yet and is a target, and outputs a motion compensation prediction image.

Next, a subtraction unit 101 executes subtraction processing of subtracting the motion compensation prediction image from the input image, and outputs a prediction error image. Next, the transformation unit 102 executes transformation processing on the input prediction error image, and outputs a transformation coefficient sequence (Step S102).

Next, the multiple quantization unit 200 executes quantization processing on the transformation coefficient sequence a plurality of times by using a plurality of quantization parameters (Step S103). The multiple quantization unit 200 stores a plurality of quantized transformation coefficient sequences generated by the quantization processing in the intermediate information buffer 201. After storing, the moving image encoding device 100 executes processing of Step S101 again.

When quantization processing is completed for all the image blocks in the frame (Yes in Step S101), the moving image encoding device 100 confirms whether or not encoding processing is completed for all the image blocks in the frame (Step S104). At a point of time when processing of Step S104 is executed, the intermediate information buffer 201 stores information on a quantized transformation coefficient sequence associated with an image block in the frame for all the image blocks in the frame.

When there is an image block for which encoding processing is not completed among all the image blocks in the frame (No in Step S104), the selection unit 202 selects, from the intermediate information buffer 201, an obtained quantized transformation coefficient sequence from among quantized transformation coefficient sequences associated with an image block which is not yet encoded and is a target (Step S105).

The obtained quantized transformation coefficient sequence is, for example, a transformation coefficient sequence quantized on the basis of a quantization parameter input from the rate control unit 111. The selection unit 202 outputs the selected quantized transformation coefficient sequence.

Next, an inverse quantization unit 104 executes inverse quantization processing on the input quantized transformation coefficient sequence, and outputs a transformation coefficient sequence. Next, an inverse transformation unit 105 executes inverse transformation processing on the input transformation coefficient sequence, and outputs a prediction error image.

Next, an adder unit 106 executes addition processing of adding the input prediction error image and a prediction image, and outputs an image. Next, a filter unit 107 executes filter processing on the image which is input, and generates a local decoded image. The filter unit 107 stores a generated local decoded image in a frame buffer 108.

A scan unit 109 executes scan processing on the input quantized transformation coefficient sequence, and outputs a rearranged transformation coefficient sequence. Next, an entropy encoding unit 110 executes entropy encoding processing on the input rearranged transformation coefficient sequence, and outputs a bit stream (Step S106).

Next, the rate control unit 111 updates a content of rate control by using information of the bit stream output in Step S106 (Step S107).

Specifically, the rate control unit 111 updates information on a bit number to be assigned to an image block to be encoded next time and thereafter, and on a quantization parameter to be input into the selection unit 202 by using information on the number of bits generated in a encoded image block, for example. After updating, the moving image encoding device 100 executes processing of Step S104 again.

When processing of Steps S105 to S107 is terminated for all the image blocks, encoding processing on one frame is completed. When encoding processing on all the image blocks in the frame is completed (Yes in Step S104), the moving image encoding device 100 ends an entirety of encoding processing.

In the foregoing, it is described that processing of Steps S102 to S103 is executed in order for each of the image blocks. Alternatively, processing of Steps S102 to S103 may be executed in parallel for a plurality of image blocks.

In the moving image encoding device in the present example embodiment, the multiple quantization unit 200 executes quantization processing a plurality of times by using a plurality of quantization parameters. Therefore, a computation amount relating to quantization processing increases. However, as compared with a method described in PTL 2, in which an entirety of encoding processing is executed twice, an amount of increase in the computation amount relating to an entirety of processing is small.

A plurality of actions of the quantization processing using a plurality of quantization parameters may be performed in parallel. Specifically, as described in PTL 1, an accelerator such as a GPU which has a strong point in parallel processing is able to execute transformation processing, quantization processing, and the like in parallel. When a GPU executes processing on a plurality of image blocks in parallel, the processing is executed at a high speed, as compared with when a CPU executes the processing for one block at a time. Therefore, the moving image encoding device in the present example embodiment is able to easily execute a plurality of quantization processing at a high speed by using a GPU or the like.

Besides a GPU, a plurality of CPUs, a personal computer (PC) cluster, an FPGA, a dedicated Large Scale Integration (LSI) circuit, or the like may be used as an accelerator for performing a plurality of actions of quantization processing at a high speed by parallel processing. Therefore, the moving image encoding device in the present example embodiment achieves high-speed processing by assigning transformation processing, quantization processing, and the like to a GPU or the like, which has high capability for parallel computation, and achieves stable rate control by feeding back a result of encoding.

The moving image encoding device in the present example embodiment is able to achieve both high-speed execution of encoding processing and stable rate control without increasing an increment of the computation amount relating to quantization processing. The reason for this is that the intermediate information buffer stores transformation coefficient sequences each quantized on the basis of a plurality of quantization parameters, and a selection unit extracts, from the intermediate information buffer, a transformation coefficient sequence associated with a quantization parameter based on an encoding result determined by a rate control unit.

Specifically, a moving image encoding device does not have to execute quantization processing twice on the basis of a quantization parameter determined by the rate control unit. Therefore, execution of an entirety of processing is got done quickly by an amount corresponding to quantization processing that is not executed. An entropy encoding unit encodes an extracted transformation coefficient sequence, and processing is repeatedly executed on a plurality of image blocks. Therefore, stable rate control is achieved in a frame as a whole.

Second Example Embodiment

[Description of Configuration]

Figure 3:
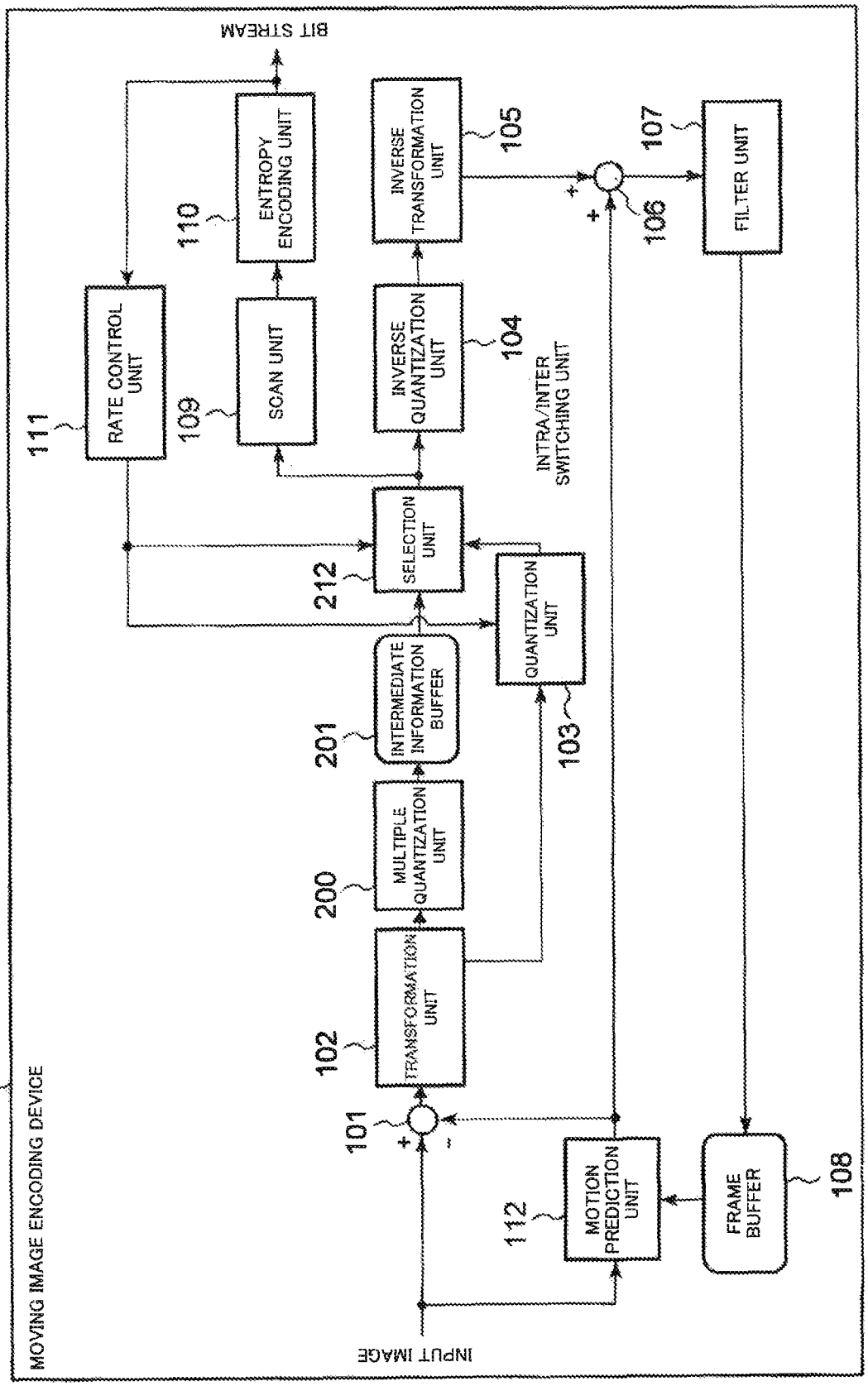
FIG. 3 is a block diagram illustrating a configuration example of a second example embodiment of the moving image encoding device according to the present invention.

Next, the second example embodiment of the present invention is described with reference to the drawings. FIG. 3 is a block diagram illustrating a configuration example of the second example embodiment of the moving image encoding device according to the present invention.

As illustrated in FIG. 3, a moving image encoding device 100 in the present example embodiment is different from the moving image encoding device 100 illustrated in FIG. 1 in a point that a quantization unit 103 is included, and in a point that a selection unit 212 is included in place of the selection unit 202. The configuration of the moving image encoding device 100 illustrated in FIG. 3 is the same as the configuration of the moving image encoding device 100 illustrated in FIG. 1 except for the quantization unit 103 and the selection unit 212.

The quantization unit 103 has the same function as the quantization unit 103 illustrated in FIG. 11. However, the quantization unit 103 in the present example embodiment is operated when a multiple quantization unit 200 does not execute quantization processing by using a quantization parameter input from a rate control unit 111. Therefore, as the number of quantization parameters to be used in quantization processing by the multiple quantization unit 200 increases, a computation amount relating to quantization processing by the multiple quantization unit 200 increases, and a possibility that the quantization unit 103 executes quantization processing decreases.

As described above, a plurality of actions of quantization processing by the multiple quantization unit 200 are executed in parallel. For example, a case in which the multiple quantization unit 200 is achieved by a GPU and the quantization unit 103 is achieved by a CPU is assumed. By adjusting the number of quantization parameters to be used in quantization processing by the multiple quantization unit 200 on the basis of a ratio of computing power between a GPU and a CPU, it is possible to operate both the GPU and the CPU in a well-balanced manner, and to execute an entirety of encoding processing efficiently.

The selection unit 212 in the present example embodiment operates the quantization unit 103 when a transformation coefficient sequence quantized on the basis of a quantization parameter input from the rate control unit 111 is not stored in an intermediate information buffer 201.

The selection unit 212 operates the quantization unit 103 in such a manner that a transformation coefficient sequence is quantized by using a quantization parameter input from the rate control unit 111. Next, the selection unit 212 selects and outputs a transformation coefficient sequence quantized by the quantization unit 103.

When a transformation coefficient sequence quantized on the basis of a quantization parameter input from the rate control unit 111 is stored in the intermediate information buffer 201, the selection unit 212 extracts an associated transformation coefficient sequence from the intermediate information buffer 201 in the same manner as the selection unit 202 in the first example embodiment. Therefore, the selection unit 212 in the present example embodiment is always able to output a transformation coefficient sequence quantized on the basis of a quantization parameter input from the rate control unit 111.

[Description of Operation]

Figure 4:
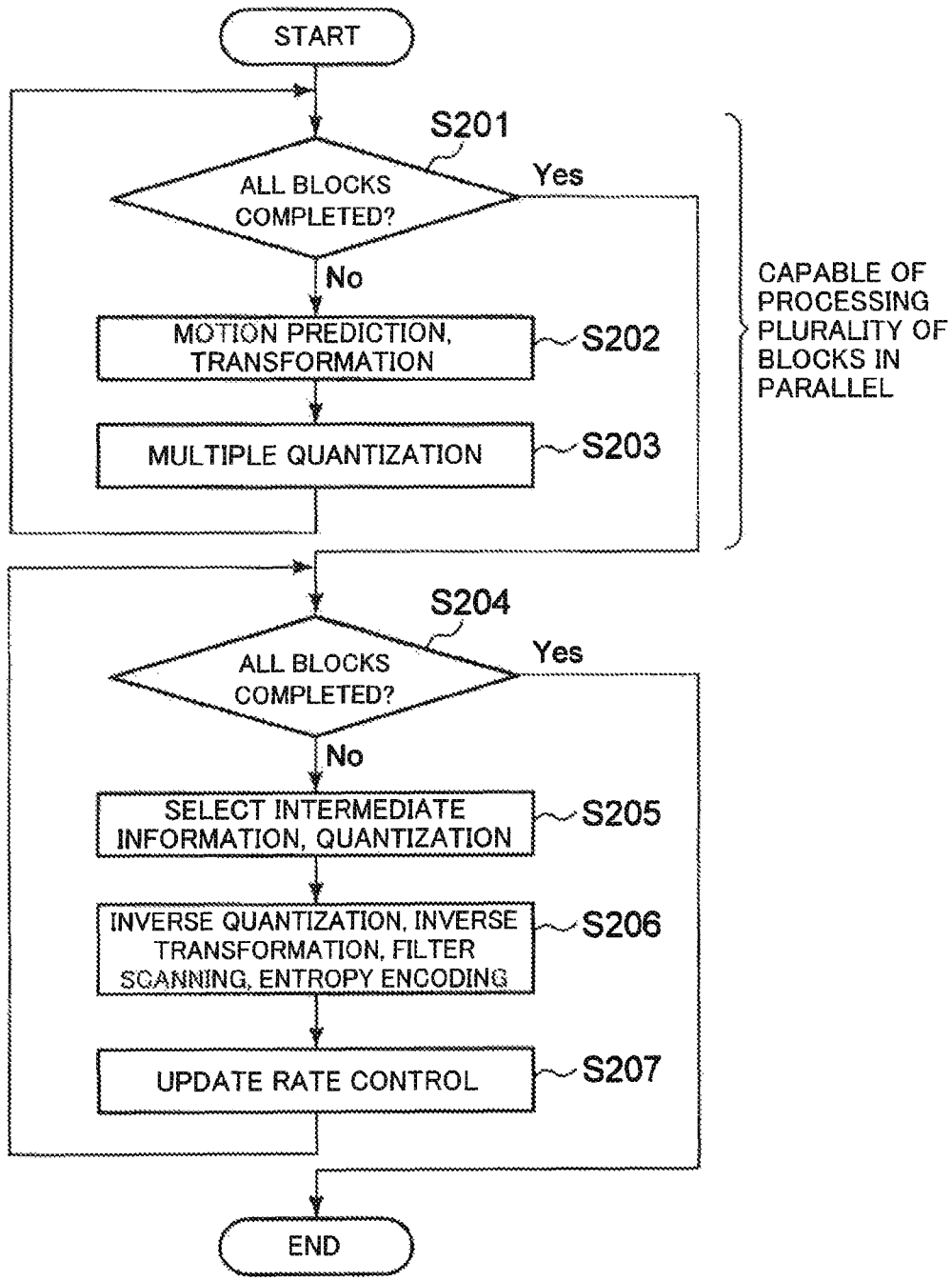
FIG. 4 is a flowchart illustrating an operation of an entirety of encoding processing by a moving image encoding device 100 in the second example embodiment.

In the following, an operation of the moving image encoding device 100 in the present example embodiment is described with reference to FIG. 4. FIG. 4 is a flowchart illustrating an operation of an entirety of encoding processing by the moving image encoding device 100 in the second example embodiment.

Processing of Steps S201 to S204 is the same as the processing of Steps S101 to S104 in the first example embodiment illustrated in FIG. 2, and therefore, description thereof is omitted.

When there is an image block for which encoding processing is not completed among all image blocks in a frame (No in Step S204), the selection unit 212 selects, from the intermediate information buffer 201, an obtained quantized transformation coefficient sequence from among quantized transformation coefficient sequences associated with an image block which is not yet encoded and is a target (Step S205).

When a transformation coefficient sequence quantized on the basis of a quantization parameter input from the rate control unit 111 is stored in the intermediate information buffer 201, the selection unit 212 selects and outputs an associated transformation coefficient sequence.

When a transformation coefficient sequence quantized on the basis of a quantization parameter input from the rate control unit 111 is not stored in the intermediate information buffer 201, the selection unit 212 operates the quantization unit 103 in such a manner that a transformation coefficient sequence is quantized by using a quantization parameter which is input. Next, the selection unit 212 selects and outputs a transformation coefficient sequence quantized by the quantization unit 103.

Processing of Steps S206 to S207 is the same as processing of Steps S106 to S107 in the first example embodiment illustrated in FIG. 2, and therefore, description thereof is omitted.

The moving image encoding device in the present example embodiment is able to achieve quantization processing, in which powers of different processors and different operation processing devices such as a GPU and a CPU are utilized. The moving image encoding device is also able to achieve stable rate control by feeding back a result of coding.

In the moving image encoding device in the present example embodiment, the quantization unit 103 is able to execute quantization processing by using a quantization parameter which is not used for quantization processing by the multiple quantization unit 200. Therefore, it is possible to encode a transformation coefficient sequence quantized on the basis of a quantization parameter input from the rate control unit 111 certainly.

Third Example Embodiment

Figure 5:
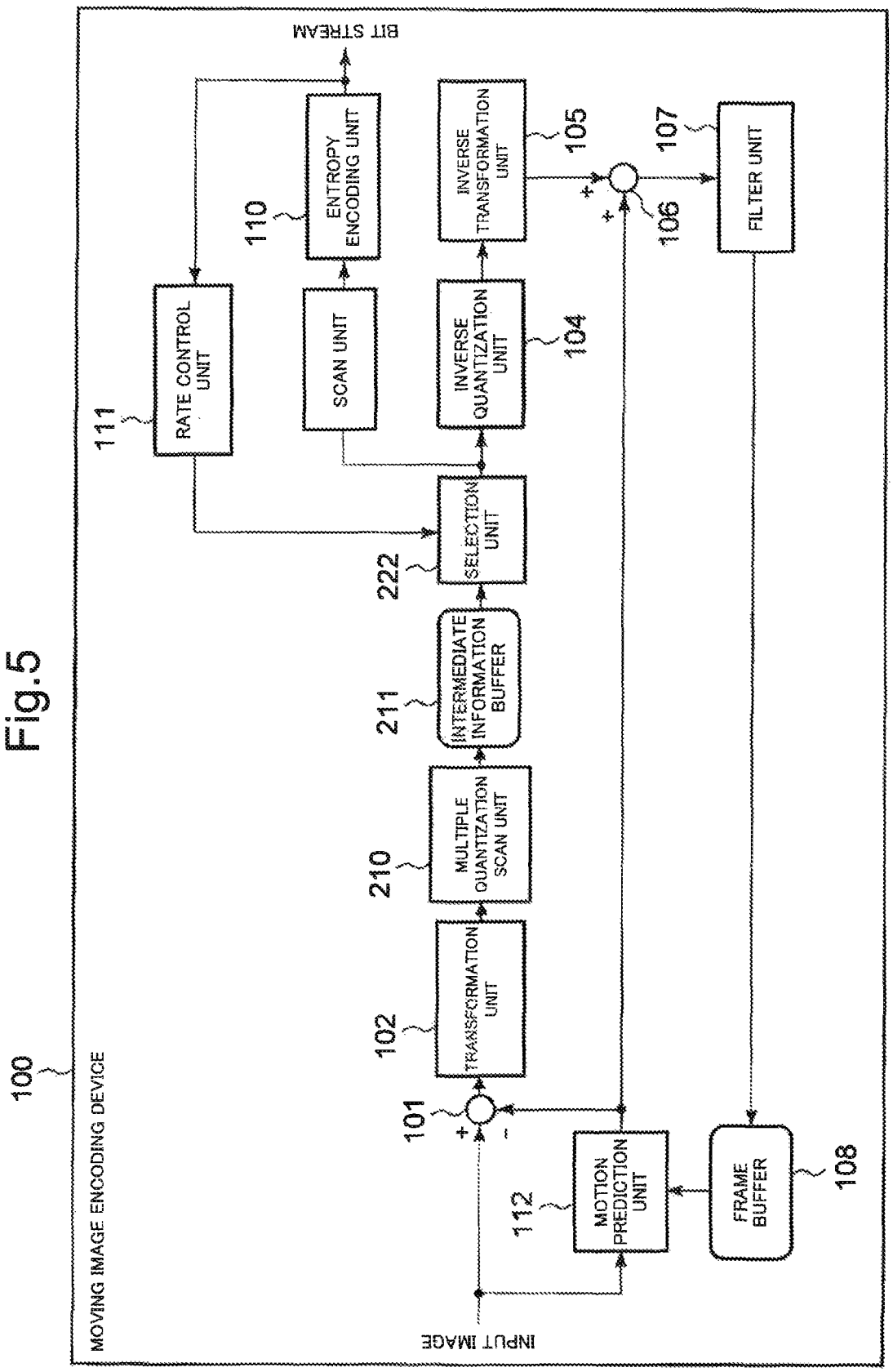
FIG. 5 is a block diagram illustrating a configuration example of a third example embodiment of the moving image encoding device according to the present invention.

[Description of Configuration]
Next, the third example embodiment of the present invention is described with reference to the drawings. FIG. 5 is a block diagram illustrating a configuration example of the third example embodiment of the moving image encoding device according to the present invention.

As illustrated in FIG. 5, a moving image encoding device 100 in the present example embodiment is different from the moving image encoding device 100 illustrated in FIG. 1 in a point that a multiple quantization scan unit 210 is included in place of the multiple quantization unit 200. The present example embodiment is different from the first example embodiment in a point that an intermediate information buffer 211 is included in place of the intermediate information buffer 201, and a point that a selection unit 222 is included in place of the selection unit 202. The present example embodiment is different from the first example embodiment in a point that the scan unit 109 is not included.

A configuration of the moving image encoding device 100 illustrated in FIG. 5 is the same as a configuration of the moving image encoding device 100 illustrated in FIG. 1 except for the multiple quantization scan unit 210, the intermediate information buffer 211, and the selection unit 222.

The multiple quantization scan unit 210 performs a plurality of actions of quantization processing by using a plurality of quantization parameters, and then, executes scan processing on a quantized transformation coefficient sequence. The scan processing executed by the multiple quantization scan unit 210 is the same as the scan processing executed by the scan units 109 in the first example embodiment and in the second example embodiment.

The multiple quantization scan unit 210 stores, in the intermediate information buffer 211, a quantized transformation coefficient sequence, and a scan processing result on the quantized transformation coefficient sequence in association with a quantization parameter used in quantization processing. In the present example embodiment, the intermediate information buffer 211 stores a scan processing result on a quantized transformation coefficient sequence, in addition to the quantized transformation coefficient sequence.

The selection unit 222 extracts, from the intermediate information buffer 211, a transformation coefficient sequence quantized on the basis of a quantization parameter input from a rate control unit 111, and a scan processing result on the quantized transformation coefficient sequence. The scan processing result which is extracted is a scan processing result stored in the intermediate information buffer 211 in association with the quantized transformation coefficient sequence which is extracted.

The selection unit 222 inputs the extracted quantized transformation coefficient sequence into an inverse quantization unit 104. The selection unit 222 inputs the extracted scan processing result into an entropy encoding unit 110.

[Description of Operation]
In the following, an operation of the moving image encoding device 100 in the present example embodiment is described with reference to FIG. 6. FIG. 6 is a flowchart illustrating an operation of an entirety of encoding processing by the moving image encoding device 100 in the third example embodiment.

Processing of Steps S301 to S302 is the same as the processing of Steps S101 to S102 in the first example embodiment illustrated in FIG. 2, and therefore, description thereof is omitted.

The multiple quantization scan unit 210 executes quantization processing on a transformation coefficient sequence a plurality of times by using a plurality of quantization parameters. Next, the multiple quantization scan unit 210 executes scan processing on the plurality of quantized transformation coefficient sequences generated by quantization processing (Step S303).

After the scan processing is executed, the multiple quantization scan unit 210 stores, in the intermediate information buffer 211, the quantized transformation coefficient sequence, and a scan processing result on the quantized transformation coefficient sequence. After storing, the moving image encoding device 100 executes the processing of Step S301 again.

Processing of Step S304 is the same as the processing of Step S104 in the first example embodiment illustrated in FIG. 2, and therefore, description thereof is omitted.

When there is an image block for which encoding processing is not completed among all image blocks in a frame (No in Step S304), the selection unit 222 selects, from the intermediate information buffer 211, an obtained quantized transformation coefficient sequence, from among quantized transformation coefficient sequences associated with an image block which is not yet encoded and is a target.

The selection unit 222 selects a scan processing result on the selected quantized transformation coefficient sequence, which is stored in the intermediate information buffer 211 (Step S305). The selection unit 222 outputs the selected quantized transformation coefficient sequence, and the scan processing result on the quantized transformation coefficient sequence.

Processing of Steps S306 to S307 is the same as the processing of Steps S106 to S107 in the first example embodiment illustrated in FIG. 2, and therefore, description thereof is omitted.

The video encoding device in the present example embodiment is also able to execute in advance scan processing on a plurality of transformation coefficient sequences quantized on the basis of a plurality of quantization parameters. Therefore, the video encoding device in the present example embodiment is able to execute an entirety of encoding processing at a higher speed than the video encoding device in the first example embodiment by causing a GPU to execute quantization processing and scan processing in parallel, and the like.

Fourth Example Embodiment

[Description of Configuration]
Next, the fourth example embodiment of the present invention is described with reference to the drawings. FIG. 7 is a block diagram illustrating a configuration example of the fourth example embodiment of the moving image encoding device according to the present invention.

The moving image encoding devices in the first example embodiment to the third example embodiment execute encoding processing (i.e. inter-coding) using only inter-frame prediction in which motion compensation prediction is used. However, in H.264 and H.265, intra-coding of generating and encoding a prediction image by using information on neighboring pixels within a screen is also used in addition to inter-coding. The moving image encoding device in the present example embodiment is able to implement both encodings, i.e., inter-coding and intra-coding.

As illustrated in FIG. 7, a moving image encoding device 100 in the present example embodiment is different from the moving image encoding device 100 illustrated in FIG. 3 in a point that a subtraction unit 101-2 is included, in a point that a transformation unit 102-2 is included, in a point that an intra-screen prediction unit 203 is included, and in a point that an intra/inter switching unit 204 is included. The present example embodiment is different from the second example embodiment in a point that a selection unit 232 is included in place of the selection unit 212.

A configuration of the moving image encoding device 100 illustrated in FIG. 7 is the same as the configuration of the moving image encoding device 100 illustrated in FIG. 3 except for the subtraction unit 101-2, the transformation unit 102-2, the intra-screen prediction unit 203, the intra/inter switching unit 204, and the selection unit 232.

A local decoded image before filter processing is executed is input into the intra-screen prediction unit 203. The intra-screen prediction unit 203 executes intra-screen prediction processing on the input local decoded image, and outputs an intra-screen prediction image generated by the intra-screen prediction processing.

The intra/inter switching unit 204 selects one of an intra-screen prediction image or a motion compensation prediction image on the basis of a designated encoding mode, and outputs the selected image. When an intra-coding mode is designated, the intra/inter switching unit 204 outputs an intra-screen prediction image. When an inter-coding mode is designated, the intra/inter switching unit 204 outputs a motion compensation prediction image.

When the intra-coding mode is designated, an intra-screen prediction image is input from the intra-screen prediction unit 203 into the subtraction unit 101-2. Next, the subtraction unit 101-2 subtracts an intra-screen prediction image from an input image. The subtraction unit 101-2 sets an image obtained by subtracting an intra-screen prediction image as a prediction error image, and outputs the prediction error image.

When the intra-coding mode is designated, the transformation unit 102-2 executes transformation processing on the input prediction error image, and outputs a transformation coefficient sequence.

When the intra-coding mode is designated, a quantization unit 103 executes quantization processing on the transformation coefficient sequence input from the transformation unit 102-2, and outputs a quantized transformation coefficient sequence.

When the inter-coding mode is designated, the selection unit 232 is operated in the same manner as the selection unit 202 in the first example embodiment. When the intra-coding mode is designated, the selection unit 232 selects and outputs the quantized transformation coefficient sequence input from the quantization unit 103.

When encoding in the intra-coding mode, the moving image encoding device 100 uses local decoded image information of neighboring image blocks. Specifically, in the intra-coding mode, the moving image encoding device 100 is unable to execute parallel processing, which is executable in a case of processing such as motion prediction processing or quantization processing on a plurality of blocks in the inter-coding mode.

However, generally, in moving image encoding processing, many image blocks among target image blocks to be encoded are encoded in the inter-coding mode. Therefore, a moving image encoding device capable of implementing both encodings, i.e., intra-coding and inter-coding, being able to execute at least inter-coding processing at a high speed by using a GPU or the like provides significantly advantageous effects.

[Description of Operation]

In the following, an operation of the moving image encoding device 100 in the present example embodiment is described with reference to FIG. 8. FIG. 8 is a flowchart illustrating an operation of an entirety of encoding processing by the moving image encoding device 100 in the fourth example embodiment.

Processing of Steps S401 to S404 are the same as the processing of Steps S101 to S104 in the first example embodiment illustrated in FIG. 2, and therefore, description thereof is omitted.

When there is an image block for which encoding processing is not completed among all image blocks in a frame (No in Step S404), the selection unit 232 confirms whether or not a designated encoding mode is the intra-coding mode (Step S405).

When a designated encoding mode is the intra-coding mode (Yes in Step S405), the transformation unit 102-2 executes transformation processing on an intra-screen prediction image input from the intra-screen prediction unit 203, and outputs a transformation coefficient sequence (Step S406).

Next, the quantization unit 103 executes quantization processing on the transformation coefficient sequence input from the transformation unit 102-2, and outputs a quantized transformation coefficient sequence (Step S407). Next, the selection unit 232 selects and outputs the quantized transformation coefficient sequence input from the quantization unit 103 (Step S408).

When a designated encoding mode is not the intra-coding mode but is the inter-coding mode (No in Step S405), the selection unit 232 selects an obtained quantized transformation coefficient sequence from an intermediate information buffer 201 (Step S408).

Processing of Steps S409 to S410 are the same as the processing of Steps S106 to S107 in the first example embodiment illustrated in FIG. 2, and therefore, description thereof is omitted.

The moving image encoding device in the present example embodiment is capable of handling both encoding methods, i.e., an inter-coding method and an intra-coding method. The moving image encoding device in the present example embodiment is able to achieve both high-speed processing and stable rate control in inter-coding as do the first example embodiment to the third example embodiment.

The moving image encoding devices in the aforementioned example embodiments perform encoding in accordance with H.264 or H.265. The moving image encoding device according to the present invention may perform encoding according to a encoding method, such as VC-1, other than the encoding method of H.264 or H.265, or according to a encoding method which is not included in moving image encoding methods or the like in accordance with international standards.

The moving image encoding devices in the aforementioned example embodiments perform encoding by using the motion compensation prediction or the intra-screen prediction. The moving image encoding device according to the present invention may perform encoding by using a prediction method other than the motion compensation prediction or the intra-screen prediction. The moving image encoding device according to the present invention may perform encoding without using a prediction method.

Although it is possible to configure the aforementioned example embodiments by hardware, it is also possible to implement the aforementioned example embodiments by a computer program recorded in a storage medium, for example.

An information processing device illustrated in FIG. 9 includes a processor 1001, a program memory 1002, a storage medium (recording medium) 1003 for storing video data, and a storage medium 1004 for storing data such as a bit stream. The storage medium 1003 and the storage medium 1004 may be individual storage media, or may be storage areas formed in a same storage medium. As a storage medium, it is possible to use a magnetic storage medium such as a hard disk. In the storage medium 1003, at least an area in which a program is stored is a non-transitory tangible medium.

In the information processing device illustrated in FIG. 9, a program for achieving functions of the blocks illustrated in any one of FIG. 1, FIG. 3, FIG. 5, and FIG. 7 is stored in the program memory 1002. The processor 1001 achieves, by executing processing according to the program stored in the program memory 1002, the functions of each of the moving image encoding devices illustrated in FIG. 1, FIG. 3, FIG. 5, and FIG. 7.

Next, an outline of the present invention is described. FIG. 10 is a block diagram illustrating an outline of the moving image encoding device according to the present invention. A moving image encoding device 10 according to the present invention includes a quantization unit 11 (e.g. the multiple quantization unit 200) that quantizes data of an image included in a encoding target image by using a plurality of quantization parameters separately for each of the plurality of quantization parameters; a storage unit 12 (e.g. the intermediate information buffer 201) that stores data of a plurality of quantized images each associated with quantization parameters used when quantizing; an extraction unit 13 (e.g. the selection unit 202) that extracts, from the storage unit 12, data of a predetermined-quantized image quantized by using a predetermined quantization parameter; an encoding unit 14 (e.g. the entropy encoding unit 110) that encodes data of the predetermined quantized image that is extracted; and a determination unit 15 (e.g. the rate control unit 111) that determines a predetermined quantization parameter to be used when the extraction unit 13 extracts a predetermined-quantized image next, on the basis of a result of encoding by the encoding unit 14.

According to the aforementioned configuration, the moving image encoding device is able to execute encoding processing including stable rate control processing at a high speed without greatly increasing a computation amount.

The data of the predetermined-quantized image may be data of a quantized image associated with a predetermined quantization parameter and stored in the storage unit 12.

According to the aforementioned configuration, the moving image encoding device is able to encode a transformation coefficient sequence quantized on the basis of a quantization parameter determined by the rate control unit.

The data of the predetermined-quantized image may be data of a quantized image associated with a quantization parameter which is closest in a value to a predetermined quantization parameter and stored in the storage unit 12.

According to the aforementioned configuration, the moving image encoding device is able to encode a quantized transformation coefficient sequence other than a transformation coefficient sequence quantized on the basis of a quantization parameter determined by the rate control unit.

The moving image encoding device 10 may include a second quantization unit (e.g. the quantization unit 103) that quantizes the data of the image included in the encoding target image by using a quantization parameter other than the plurality of quantization parameters used by the quantization unit 11. The extraction unit 13 may extract data of the predetermined-quantized image from the second quantization unit, in place of the storage unit 12.

According to the aforementioned configuration, the moving image encoding device is able to encode a transformation coefficient sequence quantized on the basis of a determined quantization parameter, even when a transformation coefficient sequence quantized on the basis of a quantization parameter determined by the rate control unit does not exist in the intermediate information buffer.

The quantization unit 11 may scan, after quantizing the data of the image, the pieces of the quantized data of the image according to a predetermined procedure. The storage unit 12 may store pieces of the scanned data of the image, and the pieces of the scanned data are associated with the pieces of the quantized data of the image. The extraction unit 13 may extract the piece of predetermined-quantized data of the image, and a piece of scanned data of the image, and the piece of the scanned data is associated with the piece of the predetermined-quantized data of the image, and is stored in the storage unit 12. The encoding unit 14 may encode the extracted piece of the scanned data of the image in place of the piece of the predetermined-quantized data of the image.

According to the aforementioned configuration, the moving image encoding device is able to execute encoding processing at a higher speed.

The moving image encoding device 10 may include a motion prediction unit (e.g. the motion prediction unit 112) that generates a motion compensation prediction image by executing motion compensation prediction processing on the image included in the encoding target image; a subtraction unit (e.g. the subtraction unit 101) that generates a prediction error image by subtracting the generated motion compensation prediction image from the image; and a transformation unit (e.g. the transformation unit 102) that generates a transformation coefficient sequence by executing transformation processing on the generated prediction error image. The quantization unit 11 may quantize the generated transformation coefficient sequence as the data of the image included in the encoding target image.

According to the aforementioned configuration, the moving image encoding device is able to execute encoding processing in an inter-coding mode.

The moving image encoding device 10 may include an intra-screen prediction unit (e.g. the intra-screen prediction unit 203) that generates an intra-screen prediction image by executing intra-screen prediction processing on the image included in the encoding target image. The subtraction unit may generate the prediction error image by subtracting the generated intra-screen prediction image from the image.

According to the aforementioned configuration, the moving image encoding device is able to execute encoding processing in an intra-coding mode.

The quantization unit 111 may quantize pieces of data of a plurality of images included in the encoding target image in parallel.

According to the aforementioned configuration, the moving image encoding device is able to execute encoding processing at a higher speed.

The quantization unit 11 may quantize the data of the image by using all the quantization parameters that are available separately for each of the quantization parameters.

According to the aforementioned configuration, the moving image encoding device is able to store a transformation coefficient sequence quantized on the basis of a quantization parameter determined by the rate control unit in the intermediate information buffer certainly.

The extraction unit 13 may extract the data of the image after all pieces of quantized data of the image included in the encoding target image are stored in the storage unit 12.

As described above, the invention of the present application is described with reference to example embodiments. The invention of the present application, however, is not limited to the aforementioned example embodiments. The configuration and details of the invention of the present application may be modified in various ways comprehensible to a person skilled in the art within the scope of the invention of the present application.

REFERENCE SIGNS LIST

10, 100 Moving image encoding device
11, 103 Quantization unit
12 Storage unit
13 Extraction unit
14 Encoding unit
15 Determination unit
101, 101-2 Subtraction unit
102, 102-2 Transformation unit
104 Inverse quantization unit
105 Inverse transformation unit
106 Adder unit
107 Filter unit
108 Frame buffer
109 Scan unit
110 Entropy encoding unit
111 Rate control unit
112 Motion prediction unit
200 Multiple quantization unit
210 Multiple quantization scan unit
201, 211 Intermediate information buffer
202, 212, 222, 232 Selection unit
203 Intra-screen prediction unit
204 Intra/inter switching unit
1001 Processor
1002 Program memory
1003, 1004 Storage medium

The invention claimed is:

1. A moving image encoding device comprising:
a memory that stores a set of instructions; and
at least one processor configured to execute the set of instructions to:
quantize data of an image included in an encoding target image by using a plurality of quantization parameters separately for each of the plurality of quantization parameters;
store, in storage, a plurality of pieces of quantized data of the image, each of the plurality of pieces of quantized data being associated with a quantization parameter used when quantizing;
extract a piece of predetermined-quantized data of the image from the storage, the piece of the predetermined-quantized data being quantized by using a predetermined quantization parameter;
encode the extracted piece of predetermined-quantized data of the image to generate a bit stream; and
determine, by using information of the bit stream, a predetermined quantization parameter to be used when extracting a piece of predetermined-quantized data of the image next time and thereafter.

2. The moving image encoding device according to claim 1, wherein
the piece of the predetermined-quantized data of the image is a piece of the quantized data of the image, the piece of the quantized data being associated with the predetermined quantization parameter and being stored in the storage.

3. The moving image encoding device according to claim 1, wherein
the piece of the predetermined-quantized data of the image is a piece of the quantized data of the image, the piece of the quantized data being associated with a quantization parameter which is closest in a value to the predetermined quantization parameter and being stored in the storage.

4. The moving image encoding device according to claim 1, wherein:
the at least one processor is further configured to:
quantize the second data of the image included in the encoding target image by using a quantization parameter other than the plurality of quantization parameters used by; and
extract a piece of predetermined-quantized piece of the image from the quantized second data, in place of the storage.

5. The moving image encoding device according to claim 1, wherein
the at least one processor is further configured to:
scan, after quantizing the data of the image, the pieces of the quantized data of the image in accordance with a predetermined procedure;
store, in the storage, pieces of the scanned data of the image, the pieces of the scanned data being associated with the pieces of the quantized data of the image;
extract the piece of predetermined-quantized data of the image, and a piece of the scanned data of the image, the piece of the scanned data being associated with the piece of the predetermined-quantized data of the image and being stored in the storage; and
encode the extracted piece of the scanned data of the image, in place of the piece of the predetermined-quantized data of the image.

6. The moving image encoding device according to claim 1, wherein
the at least one processor is further configured to:
generate a motion compensation prediction image by executing motion compensation prediction processing on the image included in the encoding target image;
generate a prediction error image by subtracting the generated motion compensation prediction image from the image;

generate a transformation coefficient sequence by executing transformation processing on the generated prediction error image, and quantize the generated transformation coefficient sequence as the data of the image included in the encoding target image.

7. The moving image encoding device according to claim 6, wherein the at least one processor is further configured to:

generate an intra-screen prediction image by executing intra-screen prediction processing on the image included in the encoding target image; and generate the prediction error image by subtracting the generated intra-screen prediction image from the image.

8. The moving image encoding device according to a claim 1, wherein the at least one processor is further configured to:

quantize pieces of data of a plurality of images included in the encoding target image in parallel.

9. A moving image encoding method comprising:

quantizing data of an image included in an encoding target image by using a plurality of quantization parameters separately for each of the plurality of quantization parameters;

storing a plurality of pieces of quantized data of the image, each of the plurality of pieces of quantized data being associated with a quantization parameter used when quantizing;

extracting a piece of predetermined-quantized data of the image quantized by using a predetermined quantization parameter from the stored plurality of pieces of quantized data of the image, the piece of the predetermined-quantized data being quantized by using a predetermined quantization parameter;

encoding the extracted piece of the predetermined-quantized data of the image to generate a bit stream; and determining, by using information of the bit stream, a predetermined quantization parameter to be used when extracting a piece of the predetermined-quantized data of the image next time and thereafter.

10. A non-transitory computer-readable storage medium for storing a moving image encoding program which causes a computer to execute:

quantization processing of quantizing data of an image included in an encoding target image by using a plurality of quantization parameters separately for each of the plurality of quantization parameters;

storage processing of storing a plurality of pieces of quantized data of the image, each of the plurality of pieces of quantized data being associated with a quantization parameter used when quantizing;

extraction processing of extracting a piece of predetermined-quantized data of the image from the stored plurality of pieces of the quantized data of the image, the piece of the predetermined-quantized data being quantized by using a predetermined quantization parameter;

encoding processing of encoding the extracted piece of the extracted-quantized data of the image to generate a bit stream; and determination processing of determining, by using information of the bit stream, a predetermined quantization parameter to be used when extracting a piece of predetermined-quantized data of the image next time and thereafter by the encoding processing.

* * * * *